US012718259B2

(12) United States Patent
Kaitha

(10) Patent No.: US 12,718,259 B2
(45) Date of Patent: *Aug. 25, 2026

(54) COMMUNICATION CHANNEL OR COMMUNICATION TIMING SELECTION BASED ON USER ENGAGEMENT

(71) Applicant: Capital One Services, LLC, McLean, VA (US)

(72) Inventor: Sunil Kaitha, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 120 days.

This patent is subject to a terminal disclaimer.

(21) Appl. No.: 18/628,069

(22) Filed: Apr. 5, 2024

(65) Prior Publication Data

US 2024/0257163 A1 Aug. 1, 2024

Related U.S. Application Data

(63) Continuation of application No. 17/655,882, filed on Mar. 22, 2022, now Pat. No. 11,972,446.

(51) Int. Cl.

*G06Q 30/0201* (2023.01)
*G06Q 30/0204* (2023.01)
*G06Q 30/0601* (2023.01)

(52) U.S. Cl.

CPC ..... *G06Q 30/0201* (2013.01); *G06Q 30/0204* (2013.01); *G06Q 30/0631* (2013.01)

(58) Field of Classification Search

None

See application file for complete search history.

(56) References Cited

U.S. PATENT DOCUMENTS

| | | | | |
|---|---|---|---|---|
| 9,953,326 | B2 | 4/2018 | Plymouth et al. | |
| 10,616,369 | B1 * | 4/2020 | d'Andrea | H04L 67/55 |
| 2009/0030755 | A1 | 1/2009 | Altberg et al. | |
| 2010/0257241 | A1 | 10/2010 | Hale et al. | |
| 2017/0208021 | A1 * | 7/2017 | Ingram | H04L 67/535 |
| 2017/0262868 | A1 * | 9/2017 | Manjunath | G06Q 30/016 |
| 2020/0401966 | A1 * | 12/2020 | Miinch | G06Q 10/067 |
| 2022/0210106 | A1 * | 6/2022 | Angeli | G06Q 10/1093 |
| 2023/0206280 | A1 * | 6/2023 | Longo | G06Q 30/0254 705/14.52 |
| 2023/0306445 | A1 | 9/2023 | Kaitha | |

* cited by examiner

*Primary Examiner* — Mehmet Yesildag

(74) *Attorney, Agent, or Firm* — Harrity & Harrity, LLP

(57) ABSTRACT

In some implementations, a device may obtain historical information associated with user engagement with one or more historical communications associated with a user account. The device may train a machine learning model, using the historical information, to predict at least one of preferred communication channels, preferred communication timings, or preferred communication content associated with the user account. The device may determine that a communication associated with the user account is to be transmitted. The device may obtain, from the machine learning model and by the device, recommendation information including at least one of a recommended timing, a recommended communication channel, or a recommended content of the communication based on providing information associated with the user account to the machine learning model. The device may generate the communication according to the recommendation information.

20 Claims, 8 Drawing Sheets

COMMUNICATION CHANNEL OR COMMUNICATION TIMING SELECTION BASED ON USER ENGAGEMENT

RELATED APPLICATION

This application is a continuation of U.S. patent application Ser. No. 17/655,882, filed Mar. 22, 2022, which is incorporated herein by reference in its entirety.

BACKGROUND

A communication management system may communicate with a user of an account managed by the communication management system. The communication management system may manage information associated with the user and/or records associated with the user. The communication management system may send a message to the user to provide a status of the account that is based on the information and/or the records. The communication management system may receive a message from the user, a system that manages the information, or a system that manages the records.

SUMMARY

Some implementations described herein relate to a system for predicting communication channels or communication timing based on user engagement. The system may include one or more memories and one or more processors communicatively coupled to the one or more memories. The one or more processors may be configured to receive historical information associated with user engagement with one or more historical communications associated with a user account. The one or more processors may be configured to train a communication management machine learning model, using the historical information, to predict at least one of preferred communication channels, preferred communication timings, or preferred communication content associated with the user account. The one or more processors may be configured to obtain a communication associated with the user account. The one or more processors may be configured to determine, using the communication management machine learning model, at least one of a timing, a communication channel, or a content of the communication based on providing one or more inputs to the communication management machine learning model. The one or more processors may be configured to transmit the communication including the content or using the timing or the communication channel.

Some implementations described herein relate to a method for predicting communication channels or communication timing based on user engagement. The method may include obtaining, by a device, historical information associated with user engagement with one or more historical communications associated with a user account, wherein the one or more historical communications are associated with one or more services. The method may include training, by the device, a machine learning model, using the historical information, to predict at least one of preferred communication channels, preferred communication timings, or preferred communication content associated with the user account for the one or more services. The method may include determining, by the device, that a communication associated with the user account is to be transmitted, wherein the communication is associated with a service of the one or more services. The method may include obtaining, from the machine learning model and by the device, recommendation information including at least one of a recommended timing, a recommended communication channel, or a recommended content of the communication based on providing information associated with the user account and the service to the machine learning model. The method may include generating, by the device, the communication according to the recommendation information.

Some implementations described herein relate to a non-transitory computer-readable medium that stores a set of instructions for a device. The set of instructions, when executed by one or more processors of the device, may cause the device to receive historical information associated with user engagement with one or more historical communications associated with a user account and one or more services. The set of instructions, when executed by one or more processors of the device, may cause the device to train a machine learning model, using the historical information, to predict at least one of preferred communication channels, preferred communication timings, or preferred communication content associated with the user account and the one or more services. The set of instructions, when executed by one or more processors of the device, may cause the device to obtain a communication associated with the user account and a service of the one or more services. The set of instructions, when executed by one or more processors of the device, may cause the device to determine, using the machine learning model, at least one of a timing, a communication channel, or a content of the communication based on providing information associated with the user account and the service to the machine learning model. The set of instructions, when executed by one or more processors of the device, may cause the device to transmit the communication including the content or using the timing or the communication channel.

DETAILED DESCRIPTION

Figure 1A:
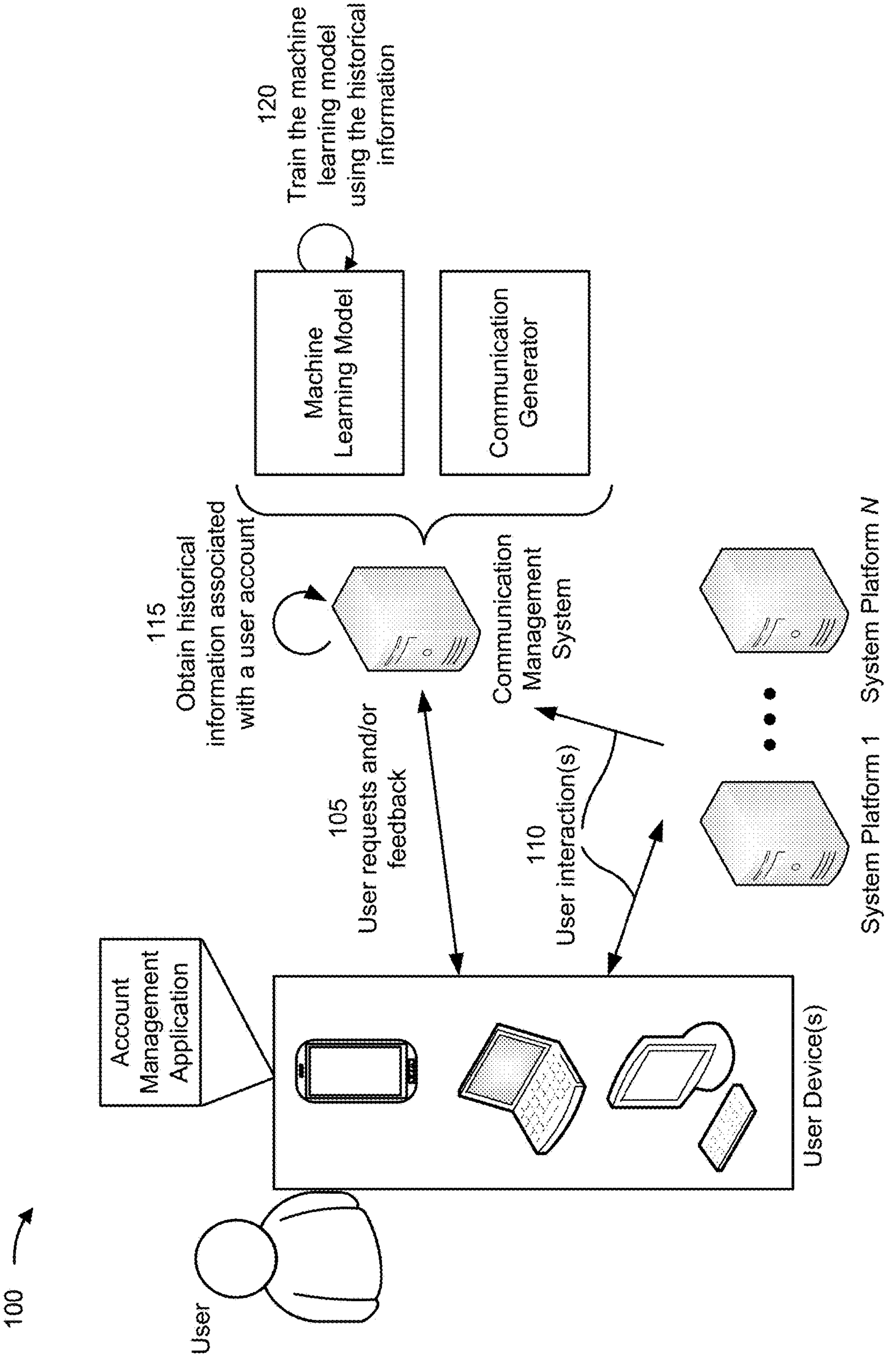
FIGS. 1A-1C are diagrams of an example implementation relating to communication channel or communication timing selection based on user engagement.

The following detailed description of example implementations refers to the accompanying drawings. The same reference numbers in different drawings may identify the same or similar elements.

A communication management system is typically tasked with pushing communication to multiple users during a certain time period or under certain conditions. Due to the quantity of communications that are to be generated and transmitted, the communication management system may schedule transmissions of the communication to the users at future points in time. For example, because the communication management system may need to transmit tens of thousands of communications, hundreds of thousands of communications, millions of communications, or more, the communication management system may determine statuses of the accounts of the customers in advance to ensure that the communication management system has enough time and resources to transmit the communications at an appropriate time or during an appropriate time period.

However, different users may prefer to receive communications at different times, via different communication channels, and/or with different content, among other examples. As used herein, "communication channel" may refer to a channel via which a communication is transmitted or provided. For example, a communication channel may include an email communication channel, a text message communication channel, a short message service (SMS) message communication channel, a chat communication channel, a voice call communication channel, a physical mail communication channel (e.g., a paper letter), and/or a notification displayed via a user device (e.g., a push notification communication channel), among other examples. For example, a first user may prefer to receive a communication at a first time (e.g., 7:00 PM) and via a first communication channel (e.g., email), and a second user may prefer to receive the communication at a second time (e.g., 8:00 AM) and via a second communication channel (e.g., text message or SMS message). However, because the communication management system may manage scheduling and/or transmitting tens of thousands of communications, hundreds of thousands of communications, millions of communications, or more, a processing overhead associated with determining a correct communication channel, timing, and/or content for a communication may prevent the communication management system from transmitting a communication using a different communication channel and/or timing for different users. As a result, the communication management system may transmit a communication to a particular user using a communication channel and/or at a time that is not acceptable for the user (e.g., resulting in the user ignoring, not opening, not reading, and/or otherwise not engaging with the communication). This may consume significant processing resources and/or network resources associated with transmitting communications that are ignored and/or otherwise not engaged with by users.

In some cases, the communication management system may receive user preferences for communication channels or time windows in which the user prefers to receive communications. However, the user preferences may indicate multiple communication channels, resulting in the communication management system transmitting the communication multiple times over the multiple communications channels (e.g., thereby consuming additional processing resources and/or network resources) or the communication management system selecting one of the multiple communication channels (e.g., thereby increasing a likelihood that the user does not receive or engage with the selected communication channel for a given communication). Additionally, the time window(s) indicated in user preferences may indicate a range of times that are acceptable to the user. However, within the range of times, the user may be busy or may not wish to receive a given communication at a particular time within the range of times. As a result, if the communication management system transmits the communication at the particular time, the user may not receive, open, and/or engage with the communication (e.g., thereby consuming processing resources and/or network resources to transmit a communication that is ignored or otherwise not engaged with by the user).

Some techniques and implementations described herein enable communication channel or communication timing selection based on user engagement. For example, the communication management system may use user engagement information to determine a communication channel, a timing, and/or a content of communications for a particular user account (e.g., for a particular user). The user engagement information may include user preferences or settings, user requests, and/or one or more interactions with a system platform. For example, the user may interact with a system platform to perform one or more actions associated with a service. The manner in which the interaction(s) take place may provide an indication as to how the user may prefer to receive communications associated with the service. The communication management system may transmit the communication using the determined communication channel and/or timing, thereby increasing a likelihood that a user will receive, open, read, respond to, and/or otherwise engage with the communication. This may conserve processing resources and/or network resources that would have otherwise been used to transmit a communication that is ignored and/or otherwise not engaged with by the user.

In some implementations, the communication management system may determine a timing, a communication channel, and/or a content of a communication based on providing one or more inputs to a communication management machine learning model. For example, the communication management machine learning model may be trained (e.g., by the communication management system or another device) using historical information associated with user engagement with one or more historical communications associated with a user account. The communication management machine learning model may be trained to predict preferred communication channels, preferred communication timings, and/or preferred communication content associated with the user account. The communication management system may use the communication management machine learning model to determine a communication channel and a specific timing for a given communication. In this way, the communication management machine learning model may apply a rigorous and automated process to determine a communication channel and a specific timing for a given communication, thereby increasing a likelihood that a user will receive, open, read, respond to, and/or otherwise engage with the communication. Additionally, the communication management system may conserve computing resources, processing resources, and/or network resources, among other examples, that would have otherwise been used transmitting communications at times and/or via communication channels that result in a user ignoring or not receiving the communications. Further, the communication management system may conserve computing resources, processing resources, and/or network resources, among other examples, that would have otherwise been used transmitting the same communication at multiple times and/or via multiple communication channels.

Figure 1B:
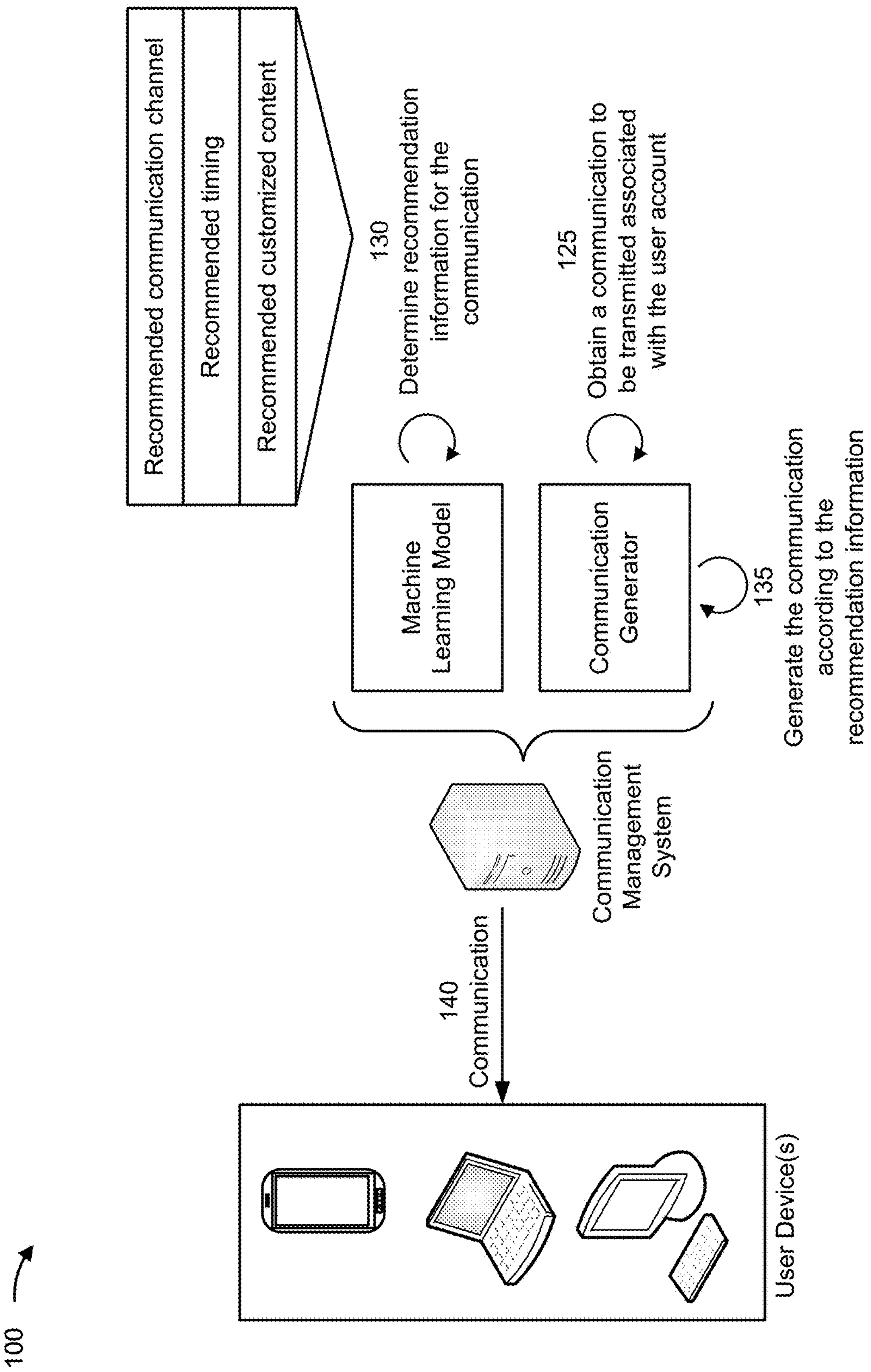
Figure 1C:
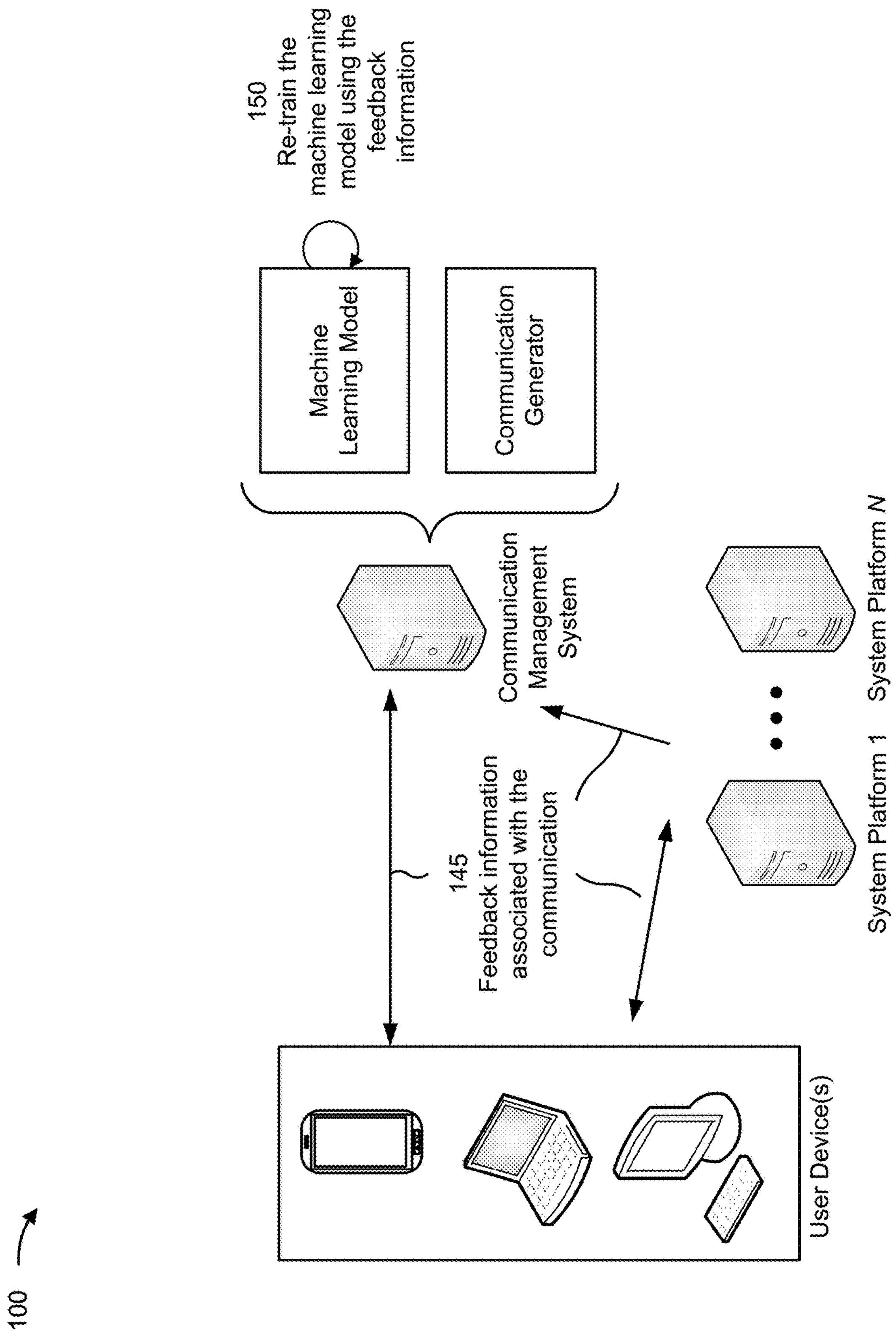

FIGS. 1A-1C are diagrams of an example 100 associated with communication channel or communication timing selection based on user engagement. As shown in FIGS. 1A-1C, example 100 includes one or more user devices, a communication management system, and one or more system platforms. These devices are described in more detail in connection with FIGS. 4 and 5. As shown, the communication management system may include, or may be associated with, a machine learning model (e.g., also referred to herein as a communication management machine learning model), and a communication generator.

The user device may include an application (Account Management Application) that is associated with the communication management system. For example, the communication management system may be associated with a backend system of the application, and the user device may include a user-side version of the application that enables the user to interact with a user account that is associated with the user. The user account and/or the application may be used by an entity associated with the communication management system to provide a service to the user. Additionally, or alternatively, the user may receive a service provided by the entity via the user account and/or the application.

The entity may be an owner of the communication management system and/or an organization that manages the communication management system. For example, the entity may be a financial institution that utilizes the communication management system to manage a financial account (e.g., a checking account, a savings account, an investment account, and/or a credit account, among other examples) associated with the user and/or to provide a financial service to the user. While certain examples are described herein in connection with a financial institution, a financial account, and/or a financial service, other examples may similarly apply. For example, the entity may be a retailer that utilizes the communication management system to manage a member services account (e.g., a rewards account or loyalty member account) and/or provide a customer service to the user; the entity may be a transportation service provider that utilizes the communication management system to manage a transportation account (e.g., a travel account, a rideshare account, and/or a delivery account) associated with the user and/or provide a transportation service to the user; and/or the entity may be a security organization that utilizes the communication management system to manage a security account (e.g., a home security account and/or an identity security account) associated with the user and/or provide a security service to the user, among other examples.

As described herein, the communication management system may perform a service in association with managing a record log associated with the user account. For example, the record log may include records that are associated with the user utilizing or receiving the service. Accordingly, the records may be associated with exchanges associated with a financial account associated with the user (e.g., payments, credits, withdrawals, or other transactions involving the financial account), user interactions involving use of the service in association with the user account (e.g., communications or indications of an authorized area of use of the user account), and/or user interactions associated with authenticating an authorized user of the account (e.g., communications or indications of authentication information that is used to authenticate a use of the user account and/or a receipt of the service via the user account). In some implementations, the records may be utilized to indicate a status associated with the service (e.g., a status associated with the user receiving the service, a status associated with the user engaging in an activity associated with the service, a status associated with an authentication of the user, a status associated with a location of the user and/or a location of receiving the service, or the like). Additionally, or alternatively, the communication management system may perform the service in association with monitoring information associated with the user.

As shown in FIG. 1A, and by reference number 105, the communication management system may receive user requests and/or feedback associated with the user account. For example, a user may interact with a user device (e.g., via the account management application) to request a communication associated with the account. For example, the user may request to be sent one or more communications associated with a status of the user account, events associated with the user account (e.g., new transactions that are completed, and/or new logins to the user account, among other examples), and/or other information associated with the user account. In some implementations, the request for communications may indicate a manner in which the user requests the communications be transmitted. For example, the request that one or more communications be transmitted may indicate a communication channel over which the user is requesting the communications be transmitted (e.g., email, physical mail, text message, and/or push notification, among other examples). Additionally, or alternatively, the request that one or more communications be transmitted may indicate contact or address information associated with the requested communication(s) (e.g., a phone number, an email address, and/or a mailing address, among other examples). In some implementations, the requested communications may be associated with a particular service or system associated with the communication management system (e.g., a financial service that is provided by the entity associated with the communication management system, among other examples).

As another example, the user may provide feedback associated with previous communications that were transmitted via the communication management system. For example, the user may interact with a user device (e.g., via the account management application) to provide the feedback. For example, the feedback may include one or more user preferences associated with communications, associated with the user account, that are transmitted to the user device(s). For example, the user preferences may include one or more communication channels over which the user wishes to receive communications, one or more user devices to which the user wishes to communications to be transmitted, one or more addresses to which the user wishes to communications to be transmitted (e.g., mailing address, email address, and/or phone number), and/or one or more time windows (e.g., a range of times during which the user wishes to receive communications), among other examples. In some implementations, the user preferences may be specific to a particular service or system associated with the communication management system (e.g., that is provided by the entity associated with the communication management system).

Additionally, or alternatively, the user may interact with a user device (e.g., via the account management application) to provide feedback associated with communications for the user account that were previously transmitted by the communication management system. For example, the feedback may include an unsubscribe request (e.g., indicating that the user no longer wishes to receive similar communications), a request to change a content of a communication (e.g., to change a name to which the communication is addressed, and/or to change a manner in which the content of the communication is presented, among other examples), an indication to transmit future communications to a different address (e.g., email address, phone number, or mailing address) or to not transmit future communications to a particular address, an indication to transmit future communications via a different communication channel (e.g., different than the communication channel used to transmit a previous communication), and/or indication to transmit future communications at a different time (e.g., different than a time at which a previous communication was transmitted), among other examples.

The feedback may be received by the communication management system. In some implementations, the feedback may be in response to a request for feedback that is transmitted by the communication management system. For example, the communication management system may transmit, to a user device, a survey that includes one or more questions to facilitate receiving the feedback. The user may interact with the user device to complete the survey. In some implementations, the communication management system may receive the feedback via another device, such as a system platform or a client device. For example, the user may call an operator associated with the entity (e.g., that is associated with the communication management system). The user may provide the feedback to the operator (e.g., verbally or via written text), and the operator may input the feedback to a device to be provided to the communication management system.

As shown by reference number 110, the user may interact with a user device to perform one or more user interactions with the one or more system platforms (e.g., system platform 1 through system platform N). For example, the one or more user devices may perform one or more actions to interact with the one or more system platforms. For example, the one or more system platforms may be associated with different services or systems associated with the communication management system (e.g., that are provided by the entity associated with the communication management system). For example, the system platform 1 may be associated with managing the user account, a system platform 2 (not shown in FIG. 1A) may be associated with creating new user accounts, a system platform 3 (not shown in FIG. 1A) may be associated with reporting fraud associated with the user account, and so on. A user interaction may include any action associated with the user account that is performed between a user device and a system platform. For example, a user interaction may include logging into a system platform to view information associated with the user account, paying a bill associated with the user account, requesting information associated with the user account, transferring funds from the user account to another account, and/or requesting an action be performed associated with the user account, among other examples.

The user may interact with a user device to perform one or more user interactions at various times, using different user devices, and/or using various communication channels, among other examples. For example, the user may use a first user device to perform a first action with a first system platform at a first time and using a first communication channel. The user may use a second user device to perform a second action with a second system platform at a second time and using a second communication channel. The various actions and corresponding information associated with the actions (e.g., a time at which the action occurred, a communication channel used to perform the action, and/or a user device associated with the action, among other examples) may be recorded by the system platform associated with the action as an event associated with the user account.

As shown in FIG. 1A, the one or more system platforms may transmit, to the communication management system, an indication of user interactions associated with the account. For example, a system platform may transmit, to the communication management system, an indication of an event associated with the user account that was recorded by the system platform. In this way, the communication management system may receive information associated with user interactions associated with the user account with the one or more system platforms.

As shown by reference number 115, the communication management system may obtain or receive historical information associated with the user account. For example, the historical information may include information associated with user engagement with one or more historical communications associated with the user account. As used herein, user engagement may refer to interactions performed by the user with a given communication. For example, user engagement may include opening a communication, receiving a communication, reading a communication, responding to a communication, and/or other interactions associated with a communication.

In some implementations, the communication management system may receive information associated with user engagement for a particular communication via a service provider associated with the communication channel over which the particular communication was transmitted. For example, if the communication channel is associated with a cellular connection (e.g., a voice call, a text message, two-way chat, or an SMS message), then the service provider may be a mobile network operator (MNO). The MNO may provide information associated with user engagement with the particular communication to the communication management system, such as whether the communication was successfully delivered, a time at which the communication was successfully delivered, and/or whether the communication was opened via the user device (e.g., if the communication is a text message or an SMS message), a report associated with the communication provided to the MNO (e.g., if the communication was reported as spam by the user), among other examples. As another example, if the communication channel is email, then the service provider may be a service provider that manages an email account associated with the user. The service provider may provide, to the communication management system, information associated with an email that was transmitted via the communication management system, such as whether the email was opened (e.g., marked as "read"), whether the email was successfully delivered, whether the email was classified as spam (e.g., classified as an irrelevant or inappropriate message) or provided to another secondary inbox folder associated with the email account, a time at which the email was opened by the user, whether the user responded to the email, an indication of whether the email was marked as spam by the user, and/or a quantity of times that the user opened the email, among other examples.

In some implementations, the historical information may include one or more events associated with user interactions with the one or more system platforms. For example, the historical information may include a manner or timing in which the user previously interacted with the one or more system platforms, as described in more detail above (e.g., in connection with reference number 110). In some implementations, the historical information may include requests and/or feedback provided by the user via a user device. For example, the historical information may include information associated with previously requested communications associated with the user account, user preferences associated with the user account, and/or feedback previously provided by the user, among other examples.

As shown by reference number 120, the communication management system may train the machine learning model using the historical information. For example, the communication management system may train the machine learning model, using the historical information, to predict preferred communication channels, preferred communication timings, and/or preferred communication content, among other examples, associated with the user account. In some implementations, the machine learning model may be trained by another device (e.g., other than the communication management system), such as a server device, in a similar manner as described herein. In such examples, the trained machine learning model may be provided to the communication management system. In some implementations, the machine learning model may be trained to predict preferred communication channels, preferred communication timings, and/or preferred communication content, among other examples, associated with a particular service.

For example, the historical information may provide insight as to how and/or when a user prefers to receive communications. For example, the user may provide (e.g., via user preferences) one or more preferred time windows and/or communication channels over which the user wishes to receive communications. As another example, the user interactions associated with the one or more system platforms may indicate how and/or when a user prefers to receive communications. For example, the events (e.g., associated with the user interactions) may be analyzed (e.g., by the communication management system or the other device) to identify relevant information associated with the events. For example, the relevant information may include a time at which the user interaction occurred, a user device associated with the user interaction, a communication channel over which the user interaction occurred, a service associated with the user interaction, and/or the system platform associated with the user interaction, among other examples. The relevant information may be used to train the machine learning model.

For example, if a user often uses a particular user device to perform user interactions associated with the one or more system platforms, this may indicate that the user prefers to receive communications via the particular user device. As another example, if the user typically performs the user interactions at a given time (or within a given time window), this may indicate that the user prefers to receive communications at the given time (or within the given time window). As another example, if the user typically performs the user interactions via a mobile application executing on a user device (e.g., a mobile device), this may indicate that the user prefers to receive communications via a communication channel associated with a mobile device, such as text message, SMS message, and/or push notifications, among other examples. As another example, a category or type of user device that is typically used to perform the user interactions may indicate a preferred communication channel. For example, if the user typically performs the user interactions via a mobile device, this may indicate that the user prefers a communication channel associated with a mobile device, such as text message, SMS message, and/or push notifications, among other examples. As another example, if the user typically performs the user interactions via a desktop computer or a laptop, this may indicate that the user prefers a communication channel associated with desktop computer or laptops, such as email. If the user typically performs the user interactions via calling a help center or call center associated with the communication management system, this may indicate that the preferred communication channel is voice calls. As a result, the user interaction information associated with the one or more system platforms may be used to train the machine learning model to predict preferred communication channels, preferred communication timings, and/or preferred communication content, among other examples, associated with the user account.

Additionally, or alternatively, information associated with user engagement with historical communications may be used to train the machine learning model to predict preferred communication channels, preferred communication timings, and/or preferred communication content, among other examples, associated with the user account. For example, the information associated with user engagement may indicate that a user typically responds to communications that are transmitted via a given communication channel and/or at a given time (or within a given time window). This may indicate that the user prefers to receive communications via the given communication channel and/or at the given time (or within the given time window). As another example, the information associated with user engagement may indicate that a user has not responded to a communication, ignored a communication, marked a communication as spam or irrelevant, and/or not engaged with a communication, among other examples, that is transmitted via a given communication channel and/or at a given time (or within a given time window). This may indicate that the user does not prefer to receive communications via the given communication channel and/or at the given time (or within the given time window).

In some implementations, the historical information may include a response time associated with the one or more historical communications, a response rate associated with the one or more historical communications, a successful delivery rate associated with the one or more historical communications, and/or an opening rate associated with the one or more historical communications, among other examples. For example, the user engagement information may be analyzed to identify trends or rates associated with user engagement over various communication channels and/or at various times. For example, the communication management system may determine one or more respective response rates associated with historical communications transmitted via various communications channels and/or at various times. If the response rate associated with a given communication channel is high (e.g., above a threshold), then the communication management system may determine that the user prefers to receive communications via the given communication channel. As another example, if the response rate associated with a time, or time window, is low (e.g., less than or equal to a threshold), then the communication management system may determine that the user does not prefer to receive communications at the time or during the time window.

The machine learning model may be trained to predict preferred communication channels, preferred communication timings, and/or preferred communication content, among other examples, associated with a particular service by using historical information associated with the service. For example, user engagement information associated with the service, feedback associated with communications that are associated with the service, user preferences associated with the service, among other examples, may be used to train the machine learning model. In other words, the machine learning model may be trained to predict different preferred communication channels, different preferred communication timings, and/or different preferred communication content, among other examples, associated with different services for communications that are managed and/or transmitted by the communication management system.

As shown in FIG. 1B, and by reference number 125, the communication management system may obtain a communication associated with the user account. For example, a communication generator may obtain the communication to be transmitted associated with the user account. For example, the communication management system (e.g., the communication generator) may determine that a communication associated with the user account is to be transmitted. In some implementations, the communication management system (e.g., the communication generator) may determine a service associated with the communication. In some implementations, the communication management system (e.g., the communication generator) may determine an intent associated with the communication (e.g., a message that communication is intended to convey or a purpose for sending the communication, such as an upcoming payment, a change to the user account, a notification of a missed payment, or another intent).

In some implementations, the communication may be triggered. For example, the communication may be triggered by a system platform and/or based on the communication management system detecting a trigger event. For example, the trigger event may include an action being performed associated with the user account, an amount of time until an upcoming payment satisfying a threshold, an expiration of a timer (e.g., the communication may be transmitted periodically), and/or a balance associated with the user account exceeding a balance threshold, among other examples. In some implementations, the communication may be requested by the user (e.g., via a request received by the communication management system from a user device).

As shown by reference number 130, the communication management system may determine recommendation information for the communication. For example, the communication management system may determine, using the machine learning model (e.g., the trained machine learning model), a recommended timing, a recommended communication channel, and/or a recommended content of the communication (e.g., based on providing one or more inputs to the machine learning model). For example, the one or more inputs may include the intent associated with the communication, a trigger associated with the communication (e.g., that triggered the transmission of the communication), and/or one or more other communications associated with the user account, among other examples. For example, the machine learning model may provide one or more outputs (e.g., based on the one or more inputs). The communication management system may obtain the recommendation information based on the one or more outputs (e.g., based on providing information associated with the user account and/or the service associated with the communication to the machine learning model).

For example, the recommendation information may include one or more communication channel scores associated with the communication and/or the service associated with the communication. A communication channel score may indicate a likelihood that the user will engage with the communication if the communication is transmitted via a communication channel associated with the communication channel score. For example, an output of the machine learning model may be one or more communication channel scores that are based on the inputs provided to the machine learning model, such as the intent or purpose associated with the communication, the service associated with the communication, and/or information associated with the user account, among other examples. The recommended communication channel may be based on the one or more communication channel scores. For example, the communication management system may determine, using the machine learning model, one or more communication channel scores associated with one or more communication channels. The communication management system may determine the communication channel (e.g., to be used to transmit the communication) based on the one or more communication channel scores. For example, in a case where a higher communication channel score indicates that the user is more likely to engage with the communication transmitted via a specific communication channel (e.g., an email message), the communication management system may determine that specific communication channel as the preferred communication channel (e.g., to be used to transmit the communication) based on the highest communication channel score.

In some implementations, the recommendation information may include a recommended timing of the communication. For example, an input to the machine learning model may include a user preference associated with preferred timing of communication. The user preference may indicate a range or window of times during which the user prefers to receive communications. The communication management system, using the machine learning model, may determine a time, included in the range or window of times, at which the user is most likely to engage with the communication.

In some implementations, the recommendation information may include recommended customized content that may increase a likelihood that the user will engage with the communication. For example, the recommended customized content may include a preferred name of the user (e.g., a first name, a last name, not including a middle name of the user in the communication, and/or a nickname) to which the communication is addressed. As another example, the recommended customized content may include rearranging or moving information in a template associated with the communication. For example, the communication management system may use a template to send similar communications to multiple users. In some implementations, the communication management system may determine, using the machine learning model, customizations to the template that are preferred by the user (e.g., and thereby increase a likelihood that the user will engage with the communication). For example, the communication management system may obtain template content (e.g., a form or automatically generated communication that is common to multiple communications) associated with the communication. The communication management system may customize the template content to obtain the content of the communication based on the recommendation received from the machine learning model. For example, the communication management system may extract information that is specific to the user account and/or time sensitive information (e.g., a bill amount, a balance, a due date, among other examples) and may place the extracted information at the start of the communication (e.g., in the beginning of a recorded voice call, or in the first few lines of an email, text message, or letter).

In some implementations, the recommended customization information may be based on legal requirements or other requirements. For example, certain communications may be required to include certain information (e.g., as defined, or otherwise fixed by a regulatory agency or a government agency). The communication management system may determine the recommended customization information to ensure that the required information is still included in the communication (e.g., to ensure that the requirements for the communication are complied with).

As another example, the communication management system may obtain, via the machine learning model, a recommendation that the communication is to be combined with one or more other communications, associated with the user account, in a single communication. For example, the communication management system and/or the machine learning model may receive indications of user interactions and/or events associated with the user account that are occurring near a time at which the communication is to be transmitted. The communication management system and/or the machine learning model may determine that multiple, similar communications are to be transmitted associated with the user account (e.g., based on the user performing multiple similar actions associated with a system platform or the user account). The multiple actions may each trigger separate communications. Therefore, the communication management system and/or the machine learning model may determine to combine the multiple communications, that would have otherwise been transmitted separately, into a single communication. In such examples, generating the communication (e.g., as described in more detail below) may include generating the single communication including the communication and the one or more other communications. This may conserve processing resources and/or network resources that would have otherwise been used to transmit the multiple communications. Additionally, this may increase a likelihood that the user will engage with the communication because the user does not receive multiple communications within a short period of time (e.g., and the user now only has a single communication to engage with and/or respond to).

In some implementations, the recommendations output by the machine learning model described herein may not be independent of one another. For example, a recommended communication channel may be based on a timing at which the communication is transmitted. For example, if a communication is transmitted at a first time, then the machine learning model may determine a first communication channel score for a communication channel. If the communication is transmitted at a second time, then the machine learning model may determine a second communication channel score for the communication channel. As another example, if a first communication channel is used to transmit the communication, then the machine learning model may determine a first recommended time at which the communication is to be transmitted. If a second communication channel is used to transmit the communication, then the machine learning model may determine a second recommended time at which the communication is to be transmitted. Therefore, the recommendation information may take a holistic approach to determine the communication channel, the timing, and/or the customized content to maximize a likelihood that the user will engage with the communication. For example, the machine learning model may determine an engagement score associated with the communication based on a combination of the recommended communication channel, recommended timing, and/or recommended customized content for the communication. The engagement score may be indicative of a likelihood that the user is to engage with (e.g., read, open, and/or respond to) the communication. For example, the machine learning model may determine a combination of a recommended communication channel, a recommended timing, and/or a recommended customized content for the communication that results in the best engagement score for the communication.

In some implementations, the communication management system may determine, using the machine learning model, an attribute associated with a user of the user account. The attribute may be indicative of a communication engagement profile. For example, the machine learning model may cluster user accounts into communication engagement profiles. For example, the communication management system may classify, using the machine learning model and based on the historical information associated with the user account, the user account into a user profile (e.g., communication engagement profile). The communication engagement profile may also be referred to as a user persona. For example, a first communication engagement profile may be associated with a first type of engagement, such as users who typically respond to communications, and/or users who typically pay bills on time, among other examples. A second communication engagement profile may be associated with a second type of engagement, such as users who typically do not respond to communications, and/or users who often miss payment deadlines, among other examples. The communication management system and/or the machine learning model may determine the recommendation information based on the user profile or the communication engagement profile associated with the user account. For example, the communication management system and/or the machine learning model may determine that user accounts associated with a first communication engagement profile typically prefer a first communication channel. Therefore, the communication management system and/or the machine learning model may refrain from performing one or more processing steps associated with determining the recommendation information based on the user account being clustered or classified into a communication engagement profile (e.g., thereby conserving processing resources).

As shown by reference number 135, the communication management system (e.g., the communication generator) may generate the communication according to the recommendation information. For example, the communication management system may generate the communication to be transmitted via the recommended communication channel (e.g., may generate an email, a text message, an SMS message, a physical letter, a push notification, and/or a voice recording, among other examples). The communication management system may generate the communication to be transmitted at the recommended time. In some implementations, the communication management system may generate the communication to include the recommended customized content. For example, the communication management system may generate the communication including a customized name of the user, a customized content in a body of the communication, and/or including content that would have otherwise been included in separate communications, among other examples.

In some implementations, the communication management system may generate the communication to be transmitted to a particular address (e.g., email address, phone number, and/or mailing address) and/or a particular user device associated with the user. For example, the user account may be associated with multiple email addresses. If the recommended communication channel is email, then the communication management system may determine an email address, from the multiple email addresses, to which the communication is to be transmitted (e.g., using the machine learning model).

As shown by reference number 140, the communication management system may transmit, or may cause another device to transmit, the communication. For example, the communication management system may transmit, or may cause another device to transmit, the communication using the recommended communication channel, at the recommended time, and/or including the recommended customized content, among other examples. In other words, the communication management system may transmit, or may cause another device to transmit, the communication using the determined communication channel and/or timing, thereby increasing a likelihood that a user will receive, open, read, respond to, and/or otherwise engage with the communication. This may conserve processing resources and/or network resources that would have otherwise been used to transmit a communication that is ignored and/or otherwise not engaged with by the user.

As shown in FIG. 1C, and by reference number 145, the communication management system may receive feedback information associated with the communication. The feedback information may be associated with user engagement with the communication. For example, the feedback information may indicate a level of user engagement associated with the communication. For example, the communication management system may receive an indication of one or more events associated with user engagement with the communication. The one or more events may include the communication being successfully delivered, the communication being opened or read, receiving a response to the communication, an action associated with the user account performed with a system associated with the service (e.g., a bill associated with the user account being paid via a system platform after the communication is transmitted), receiving a request to unsubscribe from future communications, a quantity of occurrences that a user engaged with the communication (e.g., a quantity of occurrences that an email was opened by the user) and/or receiving an indication that the communication was ignored (e.g., not receiving any response to the communication or an indication that an action associated with the user account was performed associated with the intent of the communication for a threshold amount of time after transmitting the communication), among other examples.

For example, the feedback information may indicate whether the user engaged with the communication that was transmitted in accordance with the recommendations obtained via the machine learning model. In some implementations, the communication management system may collect information associated with the various events associated with the communication. As shown by reference number 150, the communication management system may re-train the machine learning model using information associated with the one or more events. In other words, the communication management system may re-train the machine learning model using the feedback information associated with the communication. For example, a feedback loop may be used to train and/or update the machine learning model. The feedback loop may include providing outputs of the machine learning model (e.g., the recommended communication channel, the recommended time, and/or the recommended customized content), along with the feedback information, to the machine learning model as inputs to re-train and improve the machine learning model. The re-trained machine learning model may be utilized by the communication management system for future communications in a similar manner as described in more detail elsewhere herein.

As indicated above, FIGS. 1A-1C are provided as an example. Other examples may differ from what is described with regard to FIGS. 1A-1C.

Figure 2:
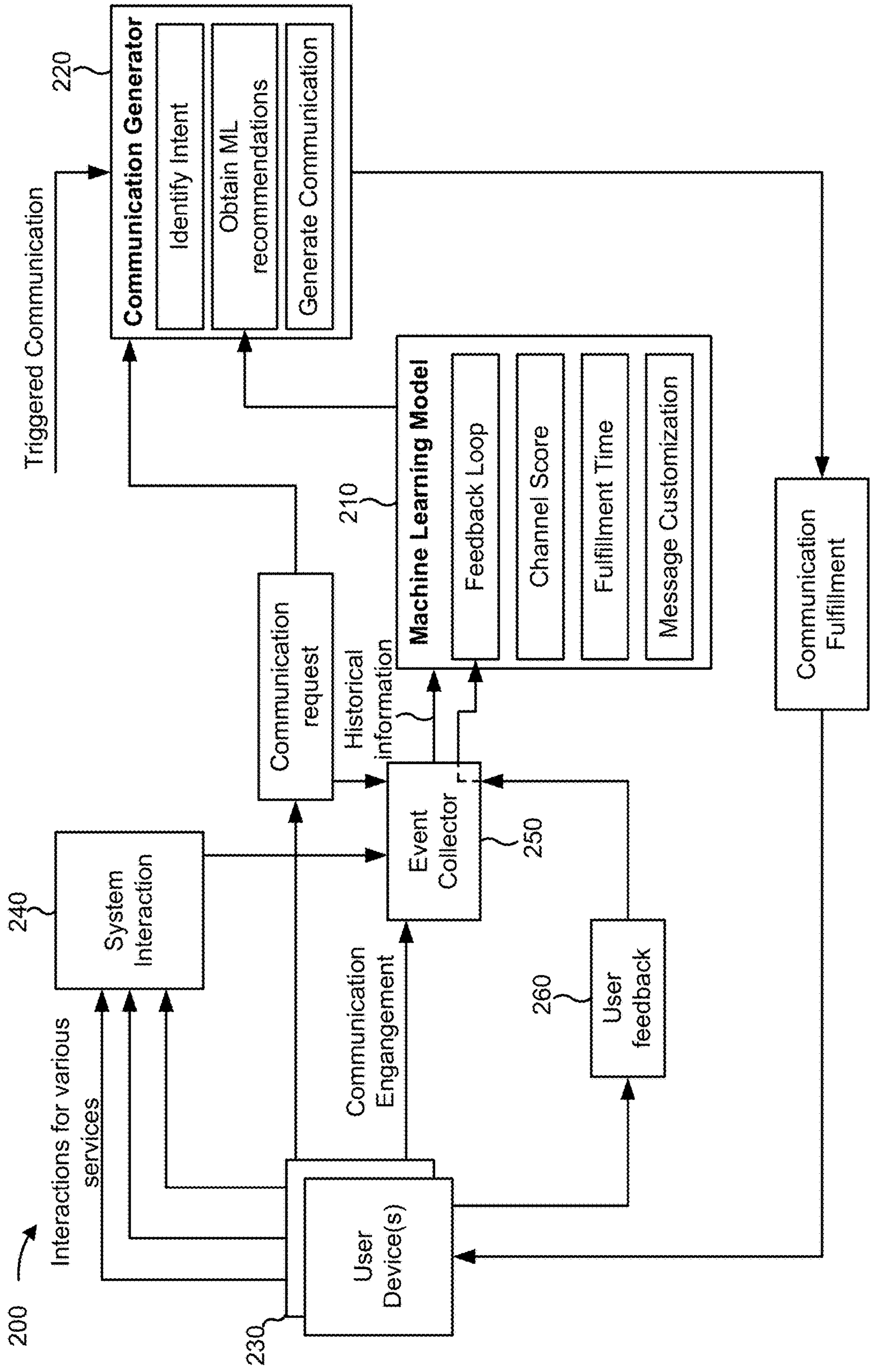
FIG. 2 is a diagram of an example implementation relating to communication channel or communication timing selection based on user engagement.

FIG. 2 is a diagram of an example 200 associated with communication channel or communication timing selection based on user engagement. FIG. 2 depicts one or more devices or modules associated with performing operations as described in more detail in connection with FIGS. 1A-1C. For example, example 200 may include a machine learning model 210, a communication generator 220, user device(s) 230, a system interaction module 240, an event collector 250, and/or a user feedback module 260, among other examples. The devices and modules depicted in FIG. 2 may be included in one or more devices. In some implementations, the devices and modules depicted in FIG. 2 may be included in a disaggregated system or may be implemented in a cloud-based architecture. For example, the blocks shown in FIG. 2 may 2 may represent hardware, software, or a combination of hardware and software.

For example, the machine learning model 210, the communication generator 220, and/or the event collector 250 may be included in the communication management system described in more detail elsewhere herein. The machine learning model 210 may output recommendation information in a similar manner as described above in connection with FIGS. 1A-1C. The machine learning model 210 may be trained using historical information associated with a user account and may predict a communication channel (e.g., a communication channel score), a fulfillment time (e.g., a recommended timing), and/or message customization for a communication to be transmitted to a particular user account. In some implementations, the machine learning model 210 may determine the recommendation information based on a service associated with the communication. The communication generator 220 may generate a communication based on the recommendations obtained from the machine learning model 210, in a similar manner as described above. In this way, the communication generator 220 may cause communications to be fulfilled (e.g., to be transmitted) associated with the user account in a manner that increases a likelihood of user engagement with the communications, as described in more detail elsewhere herein.

The event collector 250 may collect and/or analyze various events associated with the user account. For example, the event collector 250 may collect and/or analyze events associated with user interactions (e.g., with the system interaction module 240), with communication engagement associated with one or more communications, and/or with the user feedback module 260, among other examples, such as those described above in connection with FIGS. 1A-1C. For example, the user feedback module 260 may provide feedback information to the event collector 250 associated with a communication. The event collector 250 may provide the feedback information to a feedback loop of the machine learning model 210 to re-train and improve the machine learning model.

As indicated above, FIG. 2 is provided as an example. Other examples may differ from what is described with regard to FIG. 2.

Figure 3:
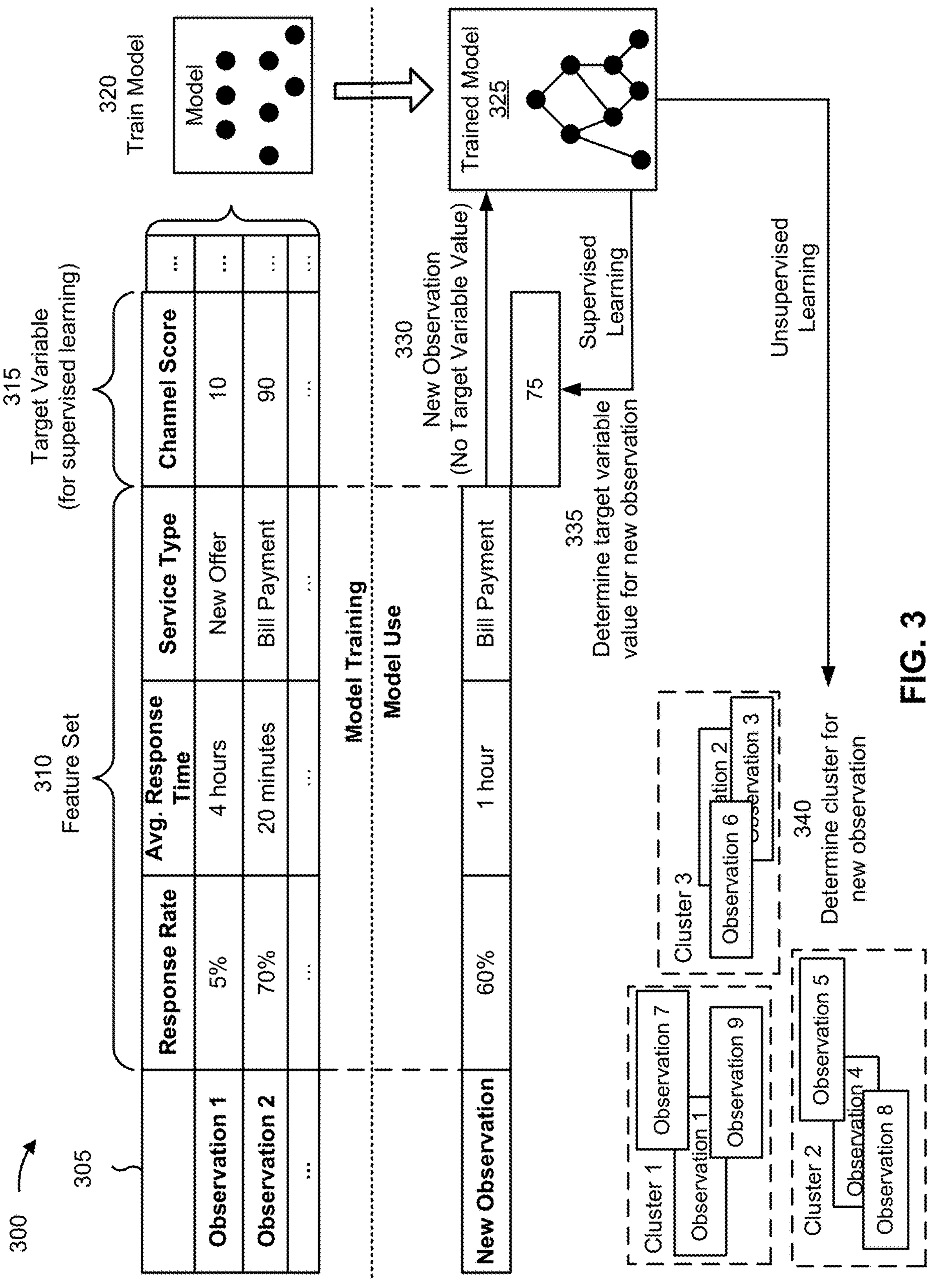
FIG. 3 is a diagram illustrating an example of training and using a machine learning model in connection with communication channel or communication timing selection based on user engagement.

FIG. 3 is a diagram illustrating an example 300 of training and using a machine learning model in connection with communication channel or communication timing selection based on user engagement. The machine learning model training and usage described herein may be performed using a machine learning system. The machine learning system may include or may be included in a computing device, a server, a cloud computing environment, or the like, such as the communication management system, a user device, and/or a system platform described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from a user device, a system platform, and/or the communication management system, as described elsewhere herein. In some examples, a deep reinforcement model may be used as the machine learning model. For example, a deep neural network may be used to compute a non-linear mapping of various user interactions or customer interactions (e.g., with a system platform) to communication actions (e.g., timing, communication channel, and/or content). This may improve user engagement with the communications and may ensure that communications are transmitted at the best time and/or via the best communication channel for a particular user, as described in more detail elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a user device, a system platform, and/or the communication management system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a response rate (e.g., a rate at which a user responds to a communication), a second feature of an average response time (e.g., an average amount of time that the user takes to respond to a communication), a third feature of a service type, and so on. As shown, for a first observation, the first feature may have a value of 5%, the second feature may have a value of 4 hours, the third feature may have a value of new offer (e.g., offering the user a new service or product), and so on. These features and feature values are provided as examples, and may differ in other examples. For example, the feature set may include one or more of the following features: a communication channel used for a communication (e.g., email, SMS message, voice call, push notification, and/or physical letter, among other examples), whether the user responded or engaged with the communication, user feedback associated with communications (e.g., an unsubscribe request, a do not contact request, and/or a communication ignore event, among other examples), user preferences or requests (e.g., indicating a preferred communication channel, preferred communication timing, and/or preferred communication content, among other examples), system interaction information (e.g., indicating information associated with user interaction with one or more system platforms, such as a timing of the interaction(s), a device used to perform the interaction(s), and/or a channel used to perform the interactions (e.g., web-based interactions, mobile interactions, or other channels), among other examples), a timing of a communication, and/or a content of a communication, among other examples.

As shown by reference number 315, the set of observations may be associated with a target variable. The target variable may represent: a variable having a numeric value, a variable having a numeric value that falls within a range of values or has some discrete possible values, a variable that is selectable from one of multiple options (e.g., one of multiples classes, classifications, or labels), and/or a variable having a Boolean value, among other examples. A target variable may be associated with a target variable value, wherein a target variable value may be specific to an observation. In example 300, the target variable is channel score, having a value of 10 for the first observation.

The feature set and target variable described above are provided as examples, and other examples may differ from what is described above. For example, for a target variable of recommended timing, the feature set may include one or more features or variables associated with a timing of communications or user interactions with the communication management system or one or more system platforms. For example, for a target variable of recommended custom content, the feature set may include one or more features or variables associated with user preferences or settings, and/or whether a user responded or engaged with a communication having certain content, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As an example, the machine learning system may obtain training data for the set of observations based on historical communications and/or information associated with historical communications. For example, the historical communications may be associated with a user account. The machine learning system may obtain training data based on information collected by the communication management system (e.g., collected from interactions with the user device(s) and/or system platform(s)). For example, the machine learning system may obtain the training data in a similar, or the same, manner as described above in connection with FIG. 1A.

As shown by reference number 330, the machine learning system may apply the trained machine learning model 325 to a new observation, such as by receiving a new observation and inputting the new observation to the trained machine learning model 325. As shown, the new observation may include a first feature of response rate, a second feature of average response time, a third feature of service type, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of 75 for the target variable of channel score for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, using the communication channel for one or more communications associated with the user account. The first automated action may include, for example, causing the one or more communications to be transmitted using the communication channel.

As another example, if the machine learning system were to predict a value of 5 for the target variable of channel score, then the machine learning system may provide a second (e.g., different) recommendation (e.g., do not use the communication channel for communications associated with the user account) and/or may perform or cause performance of a second (e.g., different) automated action (e.g., removing the communication channel from available options for transmitting communications associated with the user account).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., likely not to engage with communications via the communication channel), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., unlikely to engage with communications via the communication channel), then the machine learning system may provide a second (e.g., different) recommendation (e.g., do not use the communication channel for communications associated with the user account) and/or may perform or cause performance of a second (e.g., different) automated action, such as removing the communication channel from available options for transmitting communications associated with the user account.

As another example, the trained machine learning model 325 may classify (e.g., cluster) users or user accounts in one or more clusters. For example, a cluster may be associated with a user profile or a user persona. As an example, the clusters may include a first cluster associated with a first user profile (e.g., users that typically respond to communications and/or typically complete bill payments on time), a second cluster associated with a second user profile (e.g., users that typically do not respond to communications), a third cluster associated with a third user profile (e.g., users that typically perform an interaction with a system platform after receiving a communication), and so on. For example, if the machine learning system classifies the new observation in the first cluster, then the machine learning system may provide a first recommendation, such as to transmit a communication using a first communication channel and/or at a first time. If the machine learning system classifies the new observation in the second cluster, then the machine learning system may provide a first recommendation, such as to transmit a communication using a second communication channel and/or at a second time.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above. For example, the recommendations associated with a communication may include a communication channel, a timing, and/or a recommended custom content to be included in the communication, among other examples. The actions associated with a communication may include, for example, causing the communication to be generated and/or transmitted according to the recommendations associated with the communication.

In some implementations, the trained machine learning model 325 may be re-trained using feedback information. For example, feedback may be provided to the machine learning model. The feedback may be associated with actions performed based on the recommendations provided by the trained machine learning model 325 and/or automated actions performed, or caused, by the trained machine learning model 325. In other words, the recommendations and/or actions output by the trained machine learning model 325 may be used as inputs to re-train the machine learning model (e.g., a feedback loop may be used to train and/or update the machine learning model). For example, the feedback information may include an indication of whether a user received, responded to, or otherwise engaged with a communication that was transmitted via a communication channel and/or at a time recommended by the trained machine learning model 325.

In this way, the machine learning system may apply a rigorous and automated process to select or recommend a communication channel, timing, and/or content for a communication to increase a likelihood of user engagement with the communication. The machine learning system enables recognition and/or identification of tens, hundreds, thousands, or millions of features and/or feature values for tens, hundreds, thousands, or millions of observations, thereby increasing accuracy and consistency and reducing delay associated with selecting a communication channel, timing, and/or content for a communication to increase a likelihood of user engagement with the communication relative to requiring computing resources to be allocated for tens, hundreds, or thousands of operators to manually select or recommend a communication channel, timing, and/or content for a communication to increase a likelihood of user engagement with the communication using the features or feature values.

As indicated above, FIG. 3 is provided as an example. Other examples may differ from what is described in connection with FIG. 3.

Figure 4:
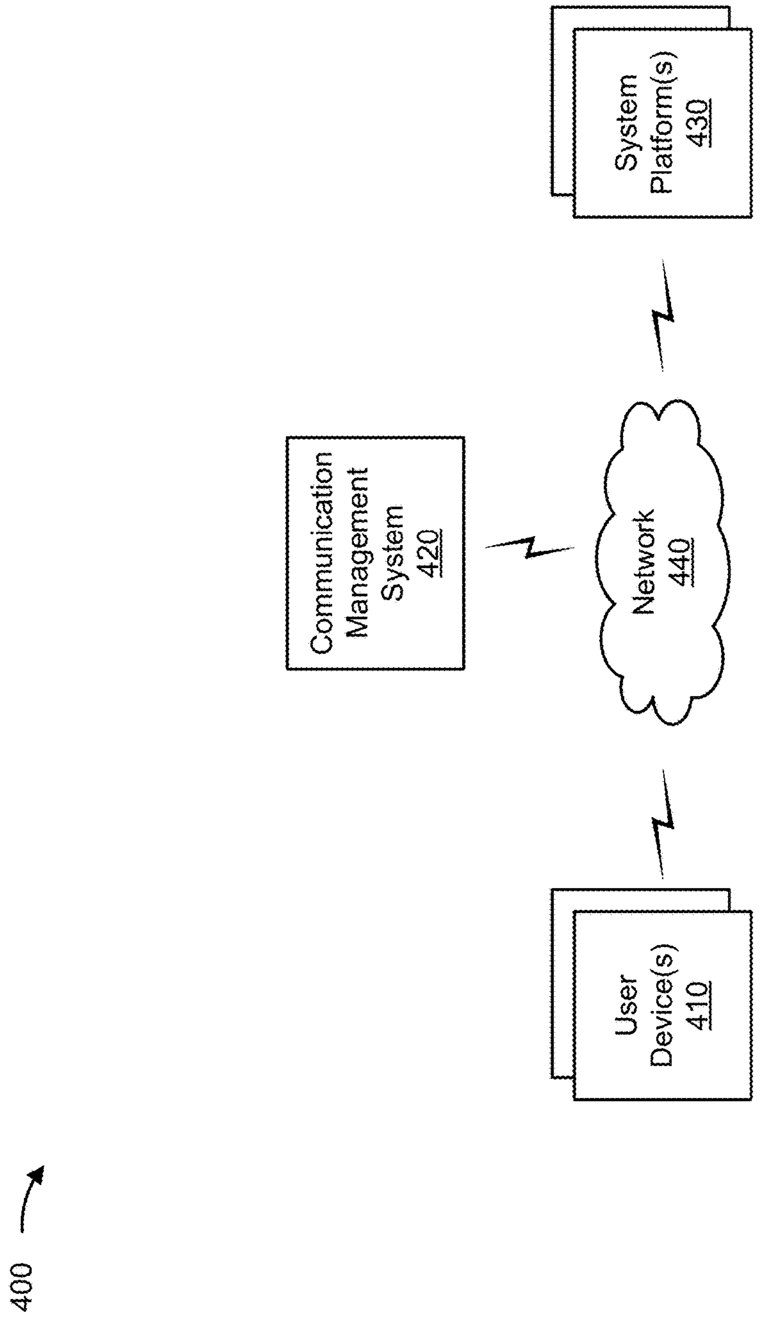
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include one or more user devices 410, a communication management system 420, one or more system platforms 430, and a network 440. Devices of environment 400 may interconnect via wired connections, wireless connections, or a combination of wired and wireless connections.

A user device 410 includes one or more devices capable of receiving, generating, storing, processing, and/or providing information associated with communication channel or communication timing selection based on user engagement, as described elsewhere herein. A user device 410 may include a communication device and/or a computing device. For example, a user device 410 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The communication management system 420 includes one or more devices capable of receiving, generating, storing, processing, providing, and/or routing information associated with communication channel or communication timing selection based on user engagement, as described elsewhere herein. The communication management system 420 may include a communication device and/or a computing device. For example, the communication management system 420 may include a server, such as an application server, a client server, a web server, a database server, a host server, a proxy server, a virtual server (e.g., executing on computing hardware), or a server in a cloud computing system. In some implementations, the communication management system 420 includes computing hardware used in a cloud computing environment.

A system platform 430 includes one or more devices capable of receiving, generating, storing, processing, providing, and/or routing information associated with communication channel or communication timing selection based on user engagement, as described elsewhere herein. A system platform 430 may include a communication device and/or a computing device. For example, a system platform 430 may include a server, such as an application server, a client server, a web server, a database server, a host server, a proxy server, a virtual server (e.g., executing on computing hardware), or a server in a cloud computing system. In some implementations, the system platform 430 includes computing hardware used in a cloud computing environment.

The network 440 includes one or more wired and/or wireless networks. For example, the network 440 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 440 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
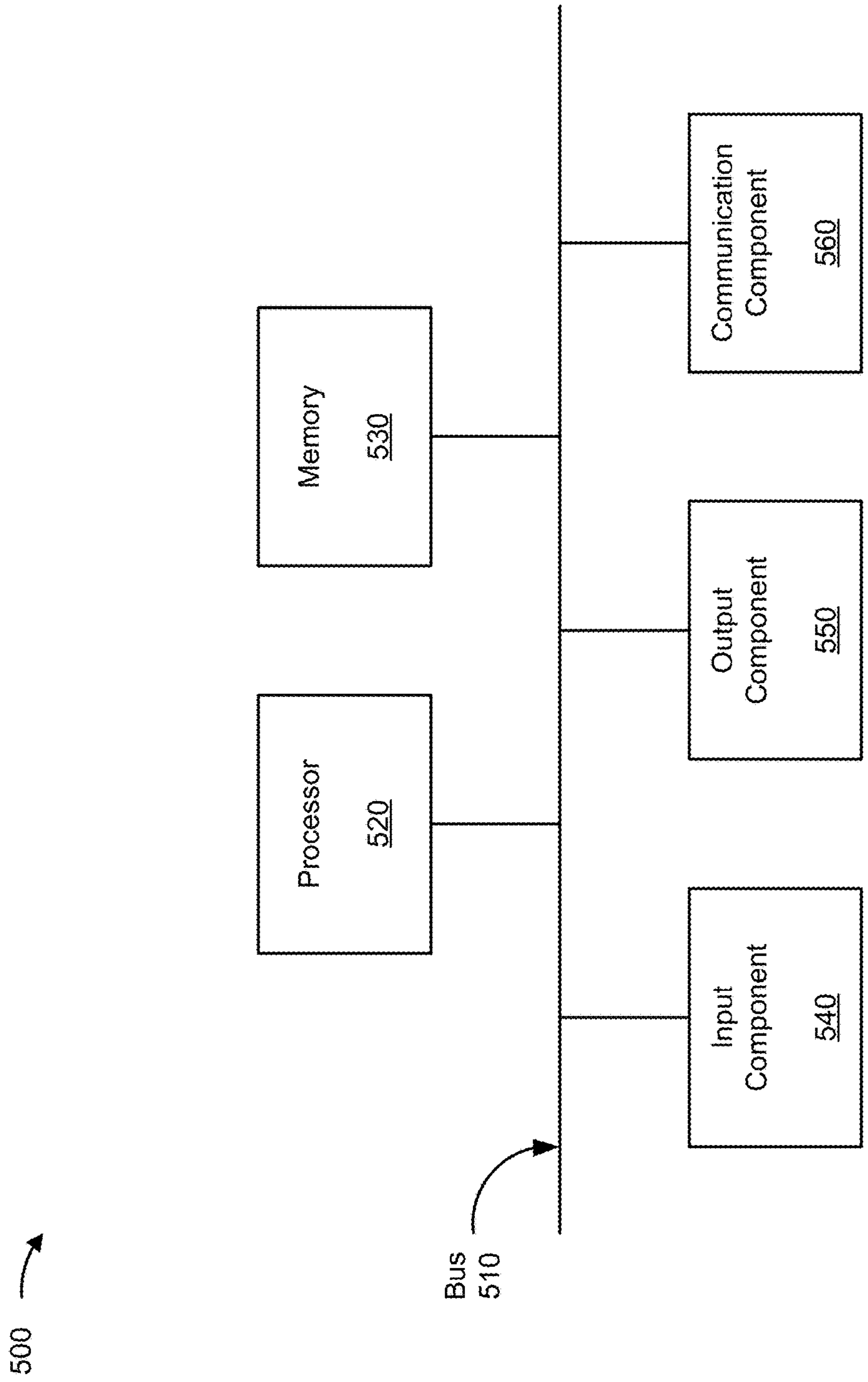
FIG. 5 is a diagram of example components of one or more devices of FIG. 4.

FIG. 5 is a diagram of example components of a device 500, which may correspond to a user device 410, the communication management system 420, and/or a system platform 430, among other examples. In some implementations, a user device 410, the communication management system 420, and/or a system platform 430 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
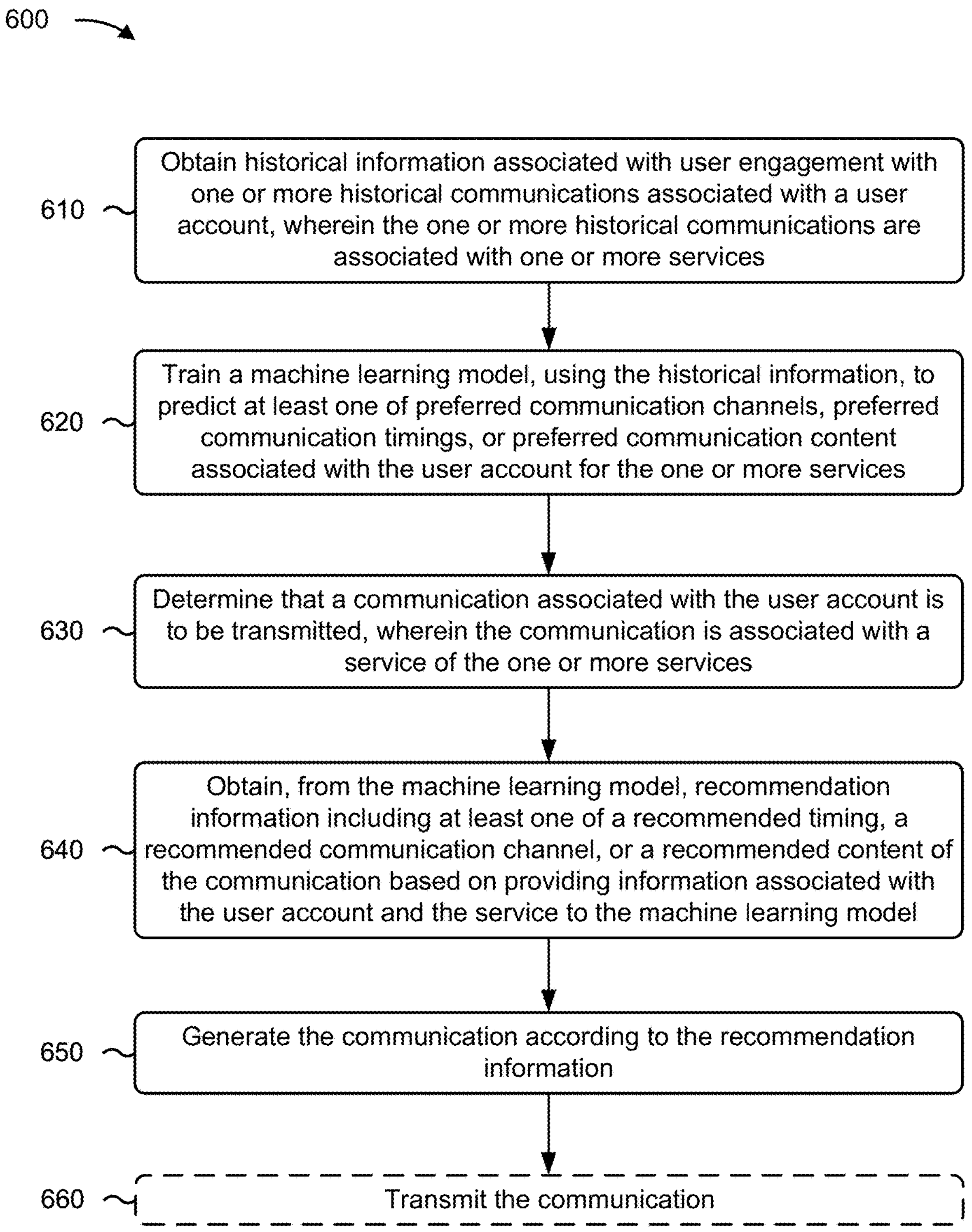
FIG. 6 is a flowchart of an example process relating to communication channel or communication timing selection based on user engagement.

FIG. 6 is a flowchart of an example process 600 associated with communication channel or communication timing selection based on user engagement. In some implementations, one or more process blocks of FIG. 6 may be performed by a communication management system (e.g., the communication management system 420). In some implementations, one or more process blocks of FIG. 6 may be performed by another device or a group of devices separate from or including the communication management system, such as a user device 410 and/or a system platform 430. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include obtaining historical information associated with user engagement with one or more historical communications associated with a user account (block 610). In some implementations, the one or more historical communications are associated with one or more services. For example, the historical information may include information associated with user engagement with one or more historical communications associated with the user account. In some implementations, the historical information may indicate user engagement for a particular communication channel and/or for a particular communication timing. For example, the historical information may indicate that a user associated with the user account typically responds to and/or otherwise engages with email communications that are transmitted at, or near, 6:30 P.M.

As further shown in FIG. 6, process 600 may include training a machine learning model, using the historical information, to predict at least one of preferred communication channels, preferred communication timings, or preferred communication content associated with the user account for the one or more services (block 620). For example, if the historical information indicates that user engagement is high for a particular communication channel (e.g., email communications), then the machine learning model may be trained to predict that a preferred communication channel for the user account is the particular communication channel (e.g., email communications). For example, as described above, based on the historical information, the machine learning model may be trained to predict that a user will engage with email communications that are transmitted at, or near, 6:30 P.M.

In some implementations, the machine learning model may be trained by another device (e.g., other than the device), such as a server device, in a similar manner as described herein. In such examples, process 600 may include receiving or obtaining the trained machine learning model.

As further shown in FIG. 6, process 600 may include determining that a communication associated with the user account is to be transmitted (block 630). In some implementations, the communication is associated with a service of the one or more services. In some implementations, the communication may be requested (e.g., by a user) or be based on detecting a triggering event.

As further shown in FIG. 6, process 600 may include obtaining, from the machine learning model and by the device, recommendation information including at least one of a recommended timing, a recommended communication channel, or a recommended content of the communication based on providing information associated with the user account and the service to the machine learning model (block 640). For example, an output of the machine learning model may indicate that the communication is to be transmitted via an email communication channel and at 6:30 P.M.

As further shown in FIG. 6, process 600 may include generating the communication according to the recommendation information (block 650). In some implementations, as further shown in FIG. 6, process 600 may include transmitting the communication including the recommended content or using the recommended timing or the recommended communication channel (block 660). For example, the communication may be transmitted as an email communication (e.g., the recommended communication channel) and at 6:30 P.M. (e.g., the recommended timing).

In some implementations, process 600 may include receiving feedback information associated with user engagement with the communication (e.g., that is transmitted using the recommended content or using the recommended timing and/or the recommended communication channel). For example, the feedback information may indicate that a user did not engage with the email communication (e.g., did not open the email, did not respond to the email, and/or marked the email as spam). In some implementations, process 600 may include re-training the machine learning model using the feedback information. For example, the machine learning model may be re-trained using the feedback information to adjust the predicted and/or recommended communication channel from an email communication channel to another communication channel (e.g., a text message communication channel). As another example, the machine learning model may be re-trained using the feedback information to adjust the predicted and/or recommended timing from 6:30 P.M. to another time (e.g., 10:00 A.M.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C, 2, and 3.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
- one or more memories; and
- one or more processors, coupled to the one or more memories, configured to:
  - determine, using a machine learning model, at least one of a timing, a communication channel, or content of a communication associated with a user account based on providing one or more inputs to the machine learning model;
  - obtain template content associated with the communication;
  - customize the template content, associated with the communication, to obtain the content based on a recommendation received from the machine learning model,
    - wherein customizing the template content includes extracting time sensitive information that is specific to the user account and placing the time sensitive information at a start of the communication, and
    - wherein the communication includes other information after the time sensitive information;
  - transmit the communication including the content, or using the timing, or using the communication channel;
  - receive feedback information indicating user engagement with the communication; and
  - re-train the machine learning model based on the feedback information and one or more outputs of the machine learning model.

2. The system of claim 1, wherein the one or more processors are further configured to:
- train the machine learning model using information indicative of user engagement with one or more historical communications.

3. The system of claim 2, wherein the information indicative of the user engagement includes a rate at which a user responds to the one or more historical communications or a successful delivery rate associated with the one or more historical communications.

4. The system of claim 1, wherein the template content is associated with sending similar communications to multiple users.

5. The system of claim 1, wherein the customized template content is based on customizations, determined by the machine learning model, that are preferred by a user of the user account.

6. The system of claim 1, wherein the time sensitive information includes a bill amount, a balance, or a due date.

7. The system of claim 1, wherein the communication includes a recorded call, an email, a text message, or a document.

8. A method, comprising:
- obtaining, from a machine learning model and by a device, a timing, a communication channel, or a content of a communication associated with a user account based on providing information to the machine learning model;
- obtaining template content associated with the communication;
- customizing the template content, associated with the communication, to obtain the content based on a recommendation received from the machine learning model, wherein customizing the template content includes extracting time sensitive information that is specific to the user account and placing the time sensitive information at a start of the communication, and wherein the communication includes other information after the time sensitive information;

generating, by the device, the communication according to the recommendation;

receiving feedback information indicating user engagement with the communication; and re-training the machine learning model based on the feedback information and one or more outputs of the machine learning model.

9. The method of claim 8, further comprising:

training, by the device, the machine learning model using information indicative of user engagement with one or more historical communications that are associated with one or more services, wherein the communication is associated with a service of the one or more services.

10. The method of claim 9, wherein the information provided to the machine learning model includes an intent associated with the communication, a trigger associated with the communication, or one or more other communications associated with the user account.

11. The method of claim 9, wherein the information indicative of the user engagement includes one or more feature sets that each include a feature associated with a communication medium, a feature associated with user response to communications, a feature associated with user feedback, a feature associated with user preferences or requests, a feature associated with system interaction, a feature associated with communication timing, or a feature associated with communication content.

12. The method of claim 8, further comprising:

obtaining, from the machine learning model and by the device, a recommendation that the communication is to be combined with one or more other communications associated with the user account based on a determination that the communication and the one or more other communications are similar.

13. The method of claim 8, wherein the template content is associated with multiple users and the customized template content is based on content preferred by the user.

14. The method of claim 8, wherein the time sensitive information includes a bill amount, a balance, or a due date.

15. The method of claim 8, wherein the communication includes a recorded call, an email, a text message, or a document.

16. A non-transitory computer-readable medium storing a set of instructions, the set of instructions comprising:

one or more instructions that, when executed by one or more processors of a device, cause the device to:

determine, using a machine learning model, at least one of a timing, a communication channel, or a content of a communication associated with a user account based on providing information to the machine learning model;

obtain template content associated with the communication;

customize the template content to obtain the content based on a recommendation received from the machine learning model, wherein customizing the template content includes extracting time sensitive information that is specific to the user account and placing the time sensitive information at a start of the communication, and wherein the communication includes other information after the time sensitive information;

transmit the communication including the content, or using the timing, or using the communication channel;

receive feedback information indicating user engagement with the communication; and re-train the machine learning model based on the feedback information and one or more outputs of the machine learning model.

17. The non-transitory computer-readable medium of claim 16, wherein customizing the template content is based on information associated with legal requirements, regulatory requirements, or other requirements.

18. The non-transitory computer-readable medium of claim 16, wherein the one or more instructions further cause the device to:

train the machine learning model using information associated with user engagement with one or more other communications.

19. The non-transitory computer-readable medium of claim 18, wherein the information associated with the user engagement includes:

a rate at which a user responds to the one or more other communications, a successful delivery rate associated with the one or more other communications, a response time associated with the one or more other communications, or an opening rate associated with the one or more other communications.

20. The non-transitory computer-readable medium of claim 16, wherein the template content is associated with multiple users and the customized template content is based on content preferred by the user.

* * * * *